Inventor
Harold R. McDermott.
by

Feb. 25, 1941.  H. R. McDERMOTT  2,233,140
CONCRETE CART
Filed March 4, 1940    2 Sheets-Sheet 2

Inventor
Harold R. McDermott.
by
G. C. Kennedy
Attorney

Patented Feb. 25, 1941

2,233,140

UNITED STATES PATENT OFFICE 2,233,140

CONCRETE CART

Harold R. McDermott, Waterloo, Iowa, assignor to Construction Machinery Company, Waterloo, Iowa Application March 4, 1940, Serial No. 322,098

1 Claim. (Cl. 298—2)

My invention relates to improvements in dumping carts, and particularly to those which have a spaced pair of carrying wheels mounted on end parts of a downwardly bowed axle where the cart body is separably interlocked medially on the intermediate part of the axle, and where rigid side bars are connected rigidly to the end parts of the axle with their forward ends pivotally connected to the extreme forward end of the cart body at opposite sides, for, when the bowed medial part is released from its connection to the cart bottom, the cart may be tilted forwardly to a desired angle for the delivery of its contents, and whereby also the body may when desired, be upturned to an extreme degree to discharge the contents vertically into a pit or receptacle of restricted dimensions immediately under the discharge end of the cart body forward of the wheels.

This object I have attained by the means which are hereinafter described and claimed, and which are illustrated in the accompanying drawings.

Figure 1:
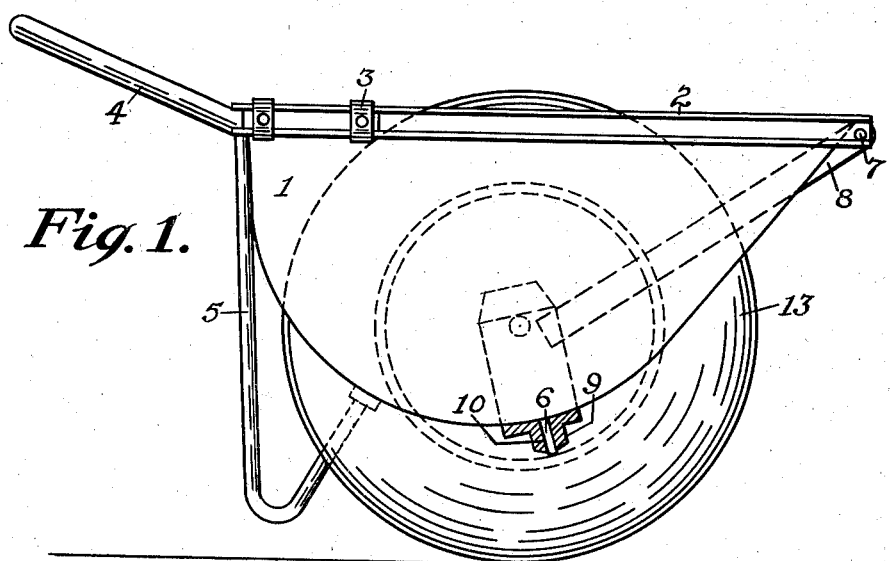
Fig. 1 is a side elevation of my improved cart, showing it mounted preferably on pneumatically tired wheels, and as releasably locked to the axle.

The spaced pair of pneumatically tired wheels 13 are rotatably mounted on the outer ends of a downwardly bowed axle 9 with lateral end parts 12. The bowed part of the axle has an aperture 10 with downwardly inclined side walls in which a truncated wedge 6 fixed on the bottom of the cart medially is seated and releasably secured by bolt and nut means as at 15.

The cart body has in the rear a spaced pair of legs 5, and a rearwardly looped rigid pushhandle 4. The upper rear and side parts of the walls of the body 1 may be reinforced by rigid flanges or bars 2, having thereon spaced handle parts 3, for interchangeable use when the operator is dumping a load.

I have supplied means for accurately locating the wedge-shaped projection 6 in its seat 10 in the medial part of the axle, said means being outwardly inclined plates 11 constituting rigid parts of the axle, whereby when the body 1 is swung rearwardly after discharging a load, it is received between said plates slidingly.

The body 1 may be of any desired shape, but preferably with a forwardly extending gradually upwardly inclined delivery part.

Figure 2:
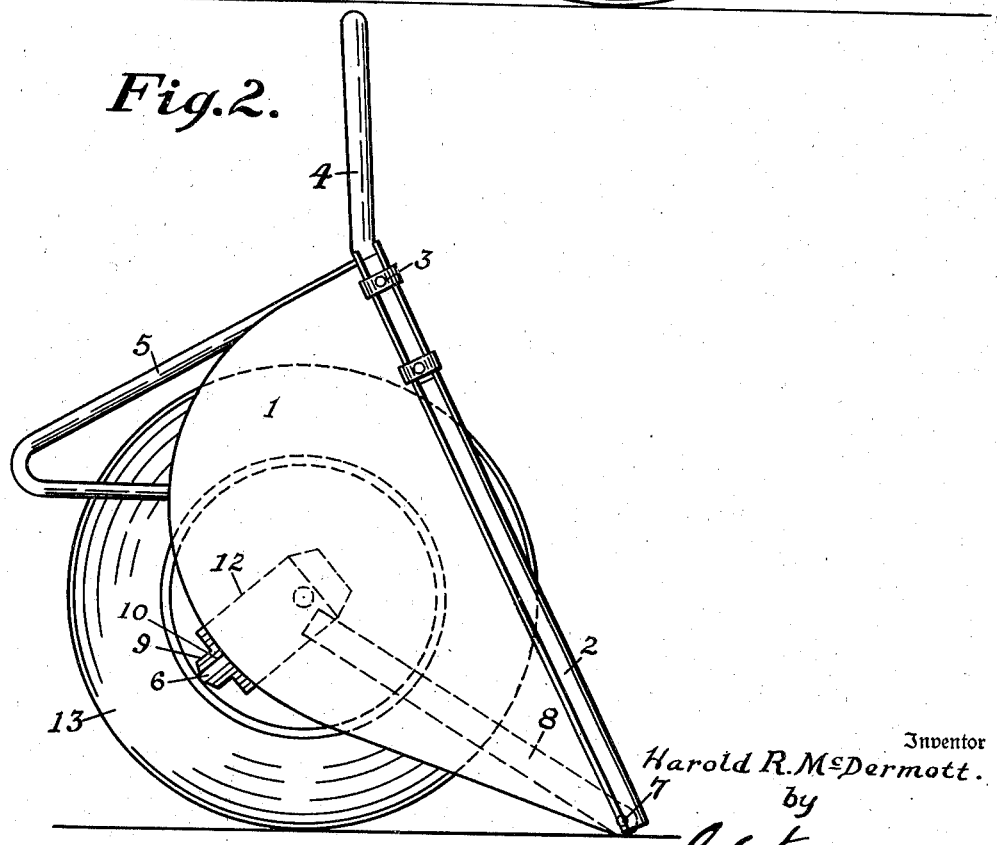
Fig. 2 is a side elevation of the cart with its body released and in a forwardly dumping position.
Figure 3:
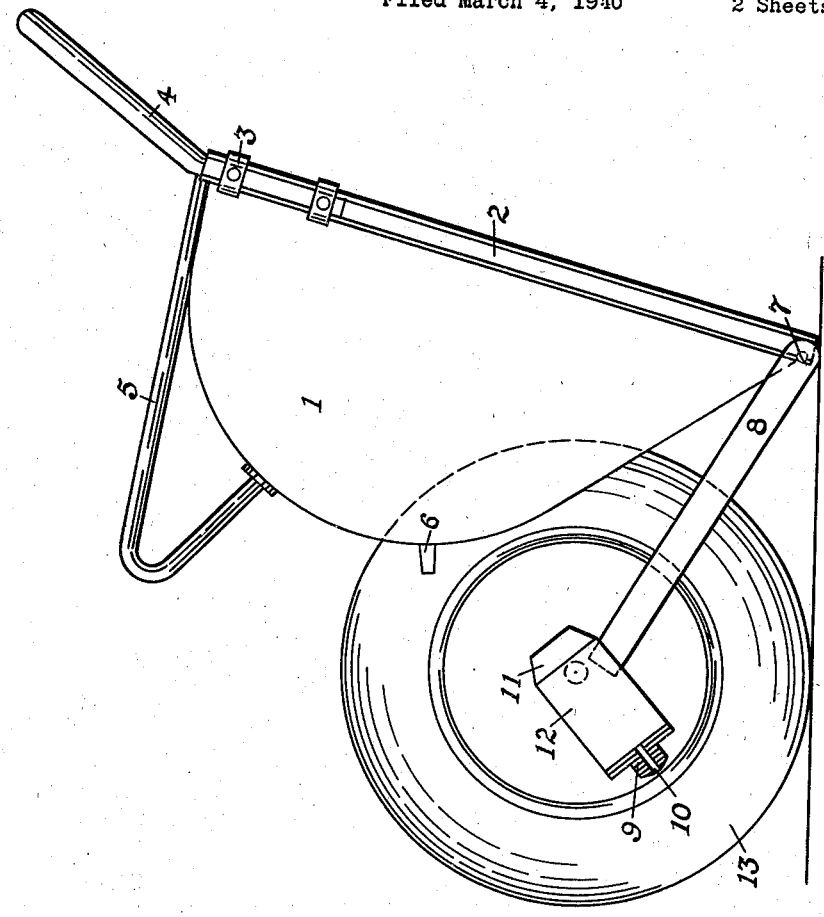
Fig. 3 is a side elevation where the body is tilted to an extreme forwardly dumping position, as when used in delivering a load vertically downwardly.
Figure 4:
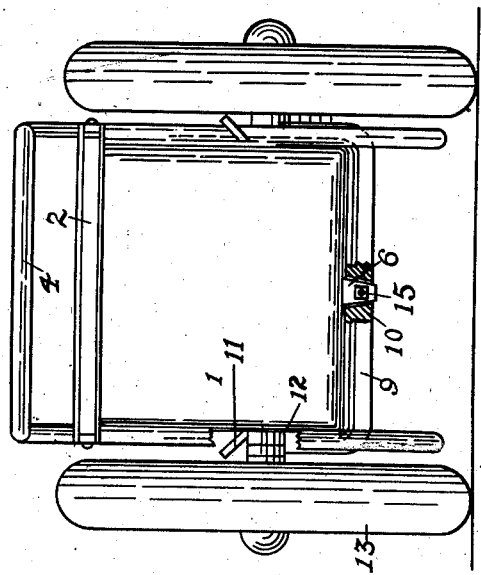
Fig. 4 is a rear elevation of the cart, in upright locked position of its body, as used in carrying a load, a medial part of the axle being broken away.

Figs. 2 and 3 are shown with the body 1 tipped forwardly in two degrees of inclination, such, as with other inclinations, may be used in the delivery of loads of various composition or fluidity. The extreme position of the body 1 as shown in Fig. 3, may be used in dumping, also, to discharge the load vertically downward into a relatively small pit or receptacle such as a mold.

As the side arms 8, fixed on the upright parts of the axle, are forwardly pivoted at 7 to the side parts of the reinforcing bars 2 at their extreme forward ends, the extreme dumping position of the body when unloading is attained for discharging the load vertically downward at the upper level of the surface traversed when desired, which object could not be attained were the forward ends of the arms 8 pivoted to any part of the body rearwardly of the pintles 7. This facilitates the quick delivery of the load, whether viscous in its contact with the inner face of the body bottom, or when the ingredients such as broken stone or the like are carried, or other bodies which become compacted together when the load is in transit.

I claim:

In a dumping cart, in combination, an axle with upwardly directed end parts having laterally projecting pintles, wheels mounted rotatably on the pintles, rigid arms projecting forwardly from and fixed on said end parts to project a distance beyond said wheels, an open top container having a forward sloping delivery end, the container seated normally level upon the medial depressed part of the axle, with the forward ends of the arms pivotally connected to the delivery end of the container, whereby the container may be forwardly tilted to discharge a load in advance of the wheels and into or upon a place of deposit, and releasable locking means between the container and the axle.

HAROLD R. McDERMOTT.